3,467,622
POLYHALO - α - HYDROXYBENZYLPHOSPHONIC AND -PHOSPHINIC COMPOSITIONS IN POLYMERS

Edward D. Weil, Yonkers, and Edwin Dorfman, Grand Island, N.Y., and Jerome Linder, Westfield, N.J., assignors to Hooker Chemical Corporation, Niagara Falls, N.Y., a corporation of New York
No Drawing. Continuation-in-part of application Ser. No. 533,792, Mar. 14, 1966. This application Nov. 29, 1967, Ser. No. 686,695
Int. Cl. C08k 3/28; C08g 51/58; C08f 45/58
U.S. Cl. 260—45.95                                    4 Claims

ABSTRACT OF THE DISCLOSURE

A fire retardant composition comprising a polymer and an effective concentration of a fire retardant compound having the general formula $$X-\underset{\underset{Y}{|}}{\overset{\overset{O}{\|}}{P}}-Z$$

where at least one and a maximum of two of the substituents X, Y and Z is

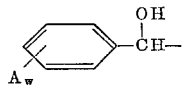

where each A is halogen independently selected from the group consisting of chlorine and bromine, $w$ is an integer between two and five and the remaining substituents are selected from the group consisting of hydrogen, alkoxy, aryloxy and no more than one hydroxy group, and salts of said compounds having hydrogen and/or hydroxy substituents on the phosphorus atom.

---

This is a continuation-in-part of Ser. No. 533,792, filed Mar. 14, 1966.

This invention is concerned with the use in polymers of new and useful compositions of matter known as polyhalogenated - alpha - hydroxybenzylphosphonic and phosphinic acids and esters thereof.

The compounds to be used are described by the general formula $$X-\underset{\underset{Z}{|}}{\overset{\overset{O}{\|}}{P}}-Y$$

where at least one and a maximum of two of the substituents X, Y and Z is

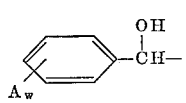

where each A is halogen independently selected from the group consisting of chlorine and bromine, $w$ is an integer from two to five, and the remaining substituents are selected from the group consisting of hydrogen, alkoxy, aryloxy, and no more than one hydroxy. These compounds are high boiling liquids or solids.

When each A is chlorine, it is preferred that there be three chlorine substituents on the benzene ring. Thus, the α-hydroxytrichlorobenzyl substituents may have the chlorine atoms in the 2,3,4-, 2,3,5-, 2,3,6-, 2,4,5-, 2,4,6- or 3,4,5- configuration. However, the di-, tetra-, and pentachlorobenzyl compounds are also to be included within the scope of this invention, including the 2,3-, 2,4-, 2,5-, 2,6-, 3,4-, 3,5-, 2,3,4,5-, 2,3,4,6-, 2,3,5,6-, and 2,3,4,5,6- configurations.

When each A is bromine, it is preferred that there be three bromine substituents on the benezene ring. Thus, the α-hydroxytrichlorobenzyl substituents may have the bromine atoms in the 2,3,4-, 2,3,5-, 2,3,6-, 2,4,5-, 2,4,6- or 3,4,5- configuration. However, the di-, tetra-, and pentachlorobenzyl compounds are also useful and to be included within the scope of this invention including the 2,3-, 2,4-, 2,5-, 2,6-, 3,4-, 3,5-, 2,3,4,5-, 2,3,4,6-, 2,3,5,6- and 2,3,4,5,6- configurations.

The compounds of the invention bearing a single α-hydroxypolychlorobenzyl group are designated as α-hydroxypolychlorobenzylphosphonic acids and derivatives thereof, and the compounds of the invention bearing two α-hydroxypolychlorobenzyl groups are designated as bis(α - hydroxypolychlorobenzyl)phosphinic acids and derivatives.

The lower alkoxy substituents which may be present in the compounds of the invention have from one to twelve carbon atoms. Representatives among these may be methoxy, ethoxy, propoxy, isopropoxy, butoxy, sec-butoxy, isobutoxy, amyloxy, hexyloxy, cyclohexyloxy, octyloxy, decyloxy, lauryloxy, and the like. Also included are lower alkoxy groups substituted by halogen, as for example 2-chloroethoxy, also lower alkoxy groups substituted by a hydroxy, such as 2-hydroxyethoxy, also lower alkoxy groups substituted by a lower alkoxy, such as 2-ethoxyethoxy, also lower alkoxy groups substituted by an aryl group, such as benzyloxy. As examples of aryloxy groups which may be present as substituents may be named phenoxy, cresoxy, chlorophenoxy, naphthoxy, and the like. Alkyl and alkoxy groups used herein have 1–12 carbon atoms.

The compounds of the invention bearing a hydroxy and/or a hydrogen group on the phosphorus atom are acids and as such readily form salts, such as the sodium, potassium, calcium, zinc, copper, ammonium, alkylammonium, dimethylammonium, trimethylammonium, and other lower alkylammonium salts, such salts being included within the scope of the invention, with the water-soluble salts being preferred.

The compounds of the invention are preferably synthesized by the reaction of phosphorous acid, hypophosphorous acid, or an ester thereof with the polychlorobenzaldehyde.

An advantage of the novel method of this invention is that it lends itself to the use of various grades of purity.

To illustrate the preparation of these compounds, the following examples are given.

Example 1.—Dimethyl α-hydroxy-2,3,6-thichlorobenzylphosphonate

A mixture of 21 parts of 2,3,6-trichlorobenzaldehyde and 15 parts of dimethyl phosphite

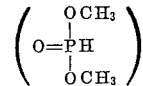

was heated under reflux by steam at 100° C. for 24 hours. The mixture was then washed with hexane and dissolved in benzene. On cooling and partial evaporation, a colorless solid crystallized out and was removed by filtration, to obtain 25 parts of product, M.P. 139.5–140.5° C. The infrared spectrum revealed a hydroxyl but no carboxyl group.

*Analysis.*—Calculated for $C_9H_{10}Cl_3O_4$: Cl, 33.3%. Found: Cl, 32.7%.

When 34.4 parts of 2,3,6-tribromobenzaldehyde are substituted for the 2,3,6-trichlorobenzaldehyde in Example 1, dimethyl α-hydroxy-2,3,6-tribromobenzylphosphate is prepared.

Example 2.—Bis(α-hydroxy-2,3,6-trichlorobenzyl) phosphinic acid

A mixture of 42 parts of 2,3,6-trichlorobenzaldehyde and 93 parts of hypophosphorus acid (calculated on 100% basis) was heated for 6 hours at 90–105° C. under nitrogen. The cooled product was triturated with water, filtered, dissolved in 3 percent aqueous caustic, filtered and reprecipitated with excess hydrochloric acid. The product was filtered, washed with water and dried to obtain 36 parts of colorless crystalline solid, M.P. 179–183° C. Titration with 0.1 N NaOH to form the soluble sodium salt showed a neutralization equivalent of 490 (theory 483).

Analysis.—Calculated for $C_{14}H_9Cl_6PO_2$: Cl, 44.1%. Found: Cl, 43.2%.

Example 3.—Diethyl α-hydroxy-2,3,6-trichlorobenzylphosphonate

A mixture of 21 parts of 2,3,6-trichlorobenzaldehyde and 18 parts of diethyl phosphite was heated at 100° C. for 20 hours. The mixture was then crystallized from a benzene-hexane mixture to obtain 20 parts of a colorless gummy solid having the proper analysis for the desired adduct.

Analysis.—Calculated for $C_{11}H_{14}O_4PCl_3$: Cl, 31.5%. Found: Cl, 30.2%.

Example 4.—Diethyl α-hydroxy-2,3,6- and 2,4,5-trichlorobenzylphosphonate

A mixture of 21 parts of a technical trichlorobenzaldehyde, analyzing 80–90% 2,3,6- and 10–20% 2,4,5-trichlorobenzaldehyde, by infrared, was reacted with diethyl phosphite as in Example 3 to obtain a mixed diethyl α-hydroxytrichlorobenzylphosphonate, a gummy colorless semi-solid.

Analysis.—Calculated for $C_{11}H_{14}O_4PCl_3$: Cl, 31.5%. Found: Cl, 30.5%.

Example 5.—Diphenyl α-hydroxy-2,3,6-trichlorobenzylphosphonate

A mixture of 21 parts of 2,3,6-trichlorobenzaldehyde and 25 parts of diphenyl phosphite was heated at 100° C. for 24 hours. The resultant mixture, glassy upon cooling, was leached with hot hexane to remove any unreacted starting materials. The remaining material was a light gray solid, M.P. 53–56° C. The infrared spectrum showed a hydroxyl but no carboxyl group.

Analysis.—Calculated for $C_{19}H_{14}O_4Cl_3P$: Cl, 24.1%. Found: Cl, 25.9%.

When 34.4 parts of 2,3,6-tribromobenzaldehyde are substituted for the 2,3,6-trichlorobenzaldehyde in Example 5, diphenyl α-hydroxy-2,3,6-tribromobenzylphosphonate is prepared.

The new compounds of the invention have utility as chemical intermediates, as pesticides, and as fire retardant ingredients of resins and polymers.

Polymers in which the composition of this invention may be incorporated include the polyesters, alkyds and paint vehicles, such as bodied linseed oil, nylon, diallyl phthalates and phthalates, isocyanates and polycarbonates. Polycarbonates are thermoplastic resins formed from a dihydroxy compound and a carbonate diester. The more important commercial polycarbonates are made from para, para isopropylidenediphenol and phosgene. Polyesters are thermoplastic resins produced by the reaction of dibasic acids and dihydroxy compounds. The unsaturated polyesters can be further polymerized by cross-linking. Alkyds are in many respects similar to polyesters, but alkyds utilize unsaturated fatty acids. Resins within the scope of this invention include the condensation reaction products of phenol and aldehyde, e.g., novolacs and thermoplastic polymers of bis-(4-hydroxyphenyl)2,2-propane and epichlorohydrin (tradename of Phenoxy). The polymeric compositions and coatings of this invention include high molecular weight polymers and resins as well as the intermediate molecular weight materials utilized for coatings and paints. The polymers embraced within the scope of this invention include the homopolymers and copolymers of unsaturated aliphatic, alicyclic, and aromatic hydrocarbons. The most common of these are formed from ethylene, propylene, butadiene and styrene.

The compositions can be physically incorporated, or where the composition is reactive with the polymer, can be chemically combined into the polymer.

For flame-retardant purposes, the compositions comprising the novel compositions of the present invention can be admixed into the polymer by one of several methods known in this art. For example, the additives can be introduced into the polymer while the latter is dissolved in a suitable solvent. This procedure is especially useful when it is desired to mix the additives during the polymer manufacturing process. When the polymer is subsequently recovered from the solvent, the additives are intermittently mixed with the polymer. Usually, the additives are mixed with the polymer in the molten state at temperatures that can range from the melting point to a temperature just below the decomposition temperature of the polymer. Alternatively, the additives and polymer are dry blended in the finely divided state so that intimate mixture is obtained upon subsequent molding or extrusion.

Among the polymers in which the compounds of this invention are useful are the homopolymers and copolymers of unsaturated aliphatic, cycloaliphatic and aromatic hydrocarbons, such as polyethylene, polypropylene, polybutene, ethylene propylene copolymers, copolymers of ethylene or propylene with other olefins, polybutadiene, polymers of butadiene, polyisoprene, natural or synthetic, polystyrene, polyvinylidene, and polymers of pentene, hexene, heptene, octene 2-methylpropene-1, 3-methylbutene-1, 4-methylpentene-1, 4-methylhexene-1, 5-methylhexene-1, bicyclohexene(2.2.1), pentadiene, hexadiene, 2,3-dimethylbutadiene-1,3, 2-methylpentadiene, vinylcyclohexene such as 4-vinylcyclohexene, cyclopentadiene, methylstyrene, and the like. Other useful polymers include indene-coumarone resins, polymers of acrylate esters and polymers of methacrylate esters, acrylate and methacrylate resins such as ethylacrylate, n-butyl methacrylate, isobutyl methacrylate, ethyl methacrylate, and methyl methacrylate, alkyd resins, hydrocarbon resins from petroleum, isobutylene resins (polyisobutylene), isocyanate resins (polyurethanes), polyester resins such as polyesters (unsaturated) of dibasic acids and dihydroxy compounds, polyesterelastomers, polyisobutylene, rubbers such as natural rubber, synthetic polyisoprene, chlorinated rubber, polybutadiene, cyclized rubber, butadiene-acrylonitrile rubber, butadiene-styrene rubber, and butyl rubber, neoprene rubber (polychloroprene), styrene resins (polystyrene), terpene resins, urea resins, vinyl resins, such as vinyl acetal, vinyl acetate or vinyl alcohol-acetate, vinyl acetate copolymer, vinyl alcohol, vinyl alkyd ether, vinyl methyl ether-maleic anhydride copolymer, vinyl chloride, vinyl butyral, vinyl chloride-acetate copolymer, vinyl pyrrolidone, and vinylidene chloride copolymer and the like.

The fire retardant compounds of the instant invention are desirably incorporated into polymer materials in an effective concentration in the range from about 5 to about 50 percent by weight of the polymer composition, and preferably from 10 to about 35 percent by weight. An antimony compound, such as antimony oxide, can be used in amounts ranging from less than one to about 30 percent by weight of the polymer composition and preferably from 5 to about 20 percent by weight of the polymer composition to further enhance flame retardant properties.

An antimony compound such as antimony oxide can also be used in the present invention. However, many antimony compounds are suitable. Inorganic antimony compounds include antimony sulfide, sodium antimonite, potassium antimonate and the like. Many organic antimony compounds are suitable such as the antimony salts of organic acids and their pentavalent derivatives disclosed in Marks and Schoepfle's United States Patent 2,996,528. Compounds of this class include antimony butyrate, antimony valerate, antimony caproate, antimony caprylate, antimony pelargonate, antimony caprate, antimony heptylate, antimony cinnamate, antimony anisate and their pentavalent dihalide derivatives. Likewise, the esters of antimonous acids and their pentavalent derivatives disclosed in Marks and Schoepfle's United States Patent 2,993,924, such as tris (n-octyl)antimonite, tri(2-ethylhexyl)antimonite, tribenzyl antimonite, tris($\beta$-chloroethyl)antimonite, tris($\beta$-chloro-propyl) antimonite, tris($\beta$-chlorobutyl)antimonite and their pentavalent dihalide derivatives. Still other suitable organic antimony compounds are the cyclic antimonites such as trimethylolpropane antimonite, pentaerythritol antimonite, and glycerol animonite. The corresponding arsenic and bismuth compounds can also be employed.

The use of fillers with the compounds of this invention is optional and depending upon the final desired product of the article being molded. Such fillers may be one or more of the following: wood flour, mica, asbestos, coloring matter and others. The Technology of Plastics and Resins, J. P. Mason and J. F. Manning, Van Nostrand Company (1945), at page 396 et seq., describes other fillers and reasons such as change of gravity, cost or chemical resistance for their use in phenol-aldehyde resins.

They have been found to have surprising activity as herbicides, as shown by the following example:

Example 6

An area seeded with corn, and having a natural infestation of broad-leaf weeds, predominantly ragweed, lambsquarters and pigweed, was sprayed pre-emergence with the products of Examples 1–5 at the rate of 8 pounds per acre. In the case of the products of Examples 1, 3, 4 and 5, the active ingredient was first dissolved in 3–5 parts of xylene and emulsified with water using Atlox 3335P, a commercial non-ionic emulsifier. The product of Example 2 was dissolved in water as the sodium salt. In each case, except with the product of Example 2, the corn germinated and grew normally, while the broad-leaf weeds were totally controlled. The product of Example 2 gave complete weed control at 8 pounds per acre but also corn damage; however, at 2 pounds per acre, the corn was undamaged and the weeds were well controlled.

The use of the compounds as fire-retardant additives for resins is illustrated by the following example.

Example 7

A polyester composed of 8.9 moles of trimethylolpropane, 5 moles of adipic acid and 1 mole of phthalic acid was cooked between 160 and 220 degrees centigrate until the acid number declined below 1. Then 5 parts of the product of Example 1, 20 parts of this polyester, 1.5 parts of water, 0.25 part of Emulphor EL719 (a polyoxyethylated vegetable oil which is a commercial emulsifying agent) and 0.1 part of N-methylmorpholine were mixed at room temperature. To this mixture were added 35 parts of the prepolymer formed by the reaction of 20 parts of the above polyester with 80 parts of toluene diisocyanate. The mixture was stirred thoroughly, poured into a mold, and allowed to expand and cure at room temperature to give a foam of 4 pounds/cu. ft. density. This foam in a standard test was classified as slow burning. A comparison foam made as above but omitting the product of Example 1 was classified as rapid burning.

When 7.1 parts of dimethyl α-hydroxy-2,3,6-tribromobenzylphosphonate are substituted for the dimethyl α-hydroxy-2,3,6-trichlorobenzylphosphonate in Example 7, a similar but less rapid burning foam is prepared.

When 6.5 parts of diphenyl α-hydroxy-2,3,6-tribromobenzylphosphonate are substituted for the dimethyl α-hydroxy-2,3,6-trichlorobenzylphosphonate in Example 7, a similar foam is prepared.

Since many changes could be made in the above compounds and methods by one of ordinary skill in the art without departing from the scope of the invention, it is intended that all matter contained in the above description shall be illustrative and not in a limiting sense.

We claim:
1. A fire retardant composition comprising an organic polymer and an effective fire retardant amount of a compound having the formula

where at least one and a maximum of two of the substituents X, Y and Z is

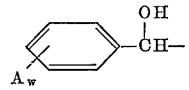

where each A is halogen independently selected from the group consisting of chlorine and bromine, $w$ is an integer between two and five and the remaining substituents are selected from the group consisting of hydrogen, alkoxy having from 1 to 12 carbon atoms, aryloxy, and no more than one hydroxy group, and salts of those said compounds having hydrogen and/or hydroxy substituents on the phosphorus atom.

2. A fire retardant composition according to claim 1 wherein the compound is dimethyl α-hydroxy-2,3,6-trichlorobenzylphosphonate.

3. A fire retardant composition according to claim 1 wherein the organic polymer is a polyurethane.

4. A fire retardant composition according to claim 1 wherein the organic polymer is a polyester.

References Cited

UNITED STATES PATENTS

| 3,255,145 | 6/1966 | Graham | 260—2.5 |
| 3,257,337 | 6/1966 | Schoepfle et al. | 260—2.5 |
| 3,351,681 | 11/1967 | Deinet | 260—953 |
| 3,376,258 | 4/1968 | Gysling | 260—45.95 |
| 3,385,801 | 5/1968 | Biron et al. | 260—2.5 |

DONALD E. CZAJA, Primary Examiner

H. E. TAYLOR, JR., Assistant Examiner

U.S. Cl. X.R.

260—2.5, 45.75, 45.9, 75, 77.5, 953